United States Patent
Huang et al.

(10) Patent No.: US 8,239,928 B2
(45) Date of Patent: Aug. 7, 2012

(54) ACCESS CONTROL SYSTEM AND METHOD BASED ON HIERARCHICAL KEY, AND AUTHENTICATION KEY EXCHANGE METHOD THEREOF

(75) Inventors: Yi-Hsiung Huang, Tainan (TW);
Lun-Chia Kuo, Taichung (TW);
Wen-Guey Tzeng, Hsinchu (TW);
Huan-Chung Lin, Taichung (TW);
Chya-Hung Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 864 days.

(21) Appl. No.: 12/351,796

(22) Filed: Jan. 9, 2009

(65) Prior Publication Data
US 2010/0122091 A1    May 13, 2010

(30) Foreign Application Priority Data
Nov. 7, 2008 (TW) .............................. 97143211 A

(51) Int. Cl.
*H04L 29/06* (2006.01)
(52) U.S. Cl. .................. 726/10; 726/4; 726/12; 726/27; 713/153; 713/159; 713/172; 713/185; 380/255; 380/262; 380/270; 380/283
(58) Field of Classification Search .................. 713/153, 713/159, 172, 185; 726/4, 10, 12, 27; 380/255, 380/262, 283
See application file for complete search history.

(56) References Cited

U.S. PATENT DOCUMENTS

| | | |
|---|---|---|
| 2002/0091921 A1 | 7/2002 | Kunzinger |
| 2004/0151319 A1 | 8/2004 | Proudler |
| 2005/0055570 A1 | 3/2005 | Kwan et al. |
| 2007/0006291 A1 | 1/2007 | Barari et al. |
| 2007/0118890 A1 | 5/2007 | Song |
| 2007/0263875 A1 | 11/2007 | Kitaya et al. |

FOREIGN PATENT DOCUMENTS

| | | |
|---|---|---|
| CN | 101166163 A | 4/2008 |
| TW | 515984 | 1/2003 |
| TW | 200404446 | 3/2004 |
| TW | 200412515 | 7/2004 |
| TW | 200527864 | 8/2005 |
| TW | 200533134 | 10/2005 |
| TW | 200605599 | 2/2006 |

*Primary Examiner* — Carl Colin
*Assistant Examiner* — Gary Lavelle
(74) *Attorney, Agent, or Firm* — Lin & Associates IP, Inc.

(57) ABSTRACT

Disclosed relates to an access control system and method based on hierarchical keys. The system comprises an access control server (ACS), a home gateway, and a plurality of sensor devices disposed on a home network. The ACS sets up user's access limits of authority and authorization verifier, and saves the related data of user's password and the user's access limits of authority. The gateway records the authority limits' level and the authority limits' key which are constructed based on a hierarchical key structure. When a user logs in the ACS to request access, an one-time communication key between the user and the home gateway is established by exchanging the ticket and the token that are issued by the ACS. This allows the user to access the information of the sensor devices.

15 Claims, 14 Drawing Sheets

| $K_0$ | $CAM_1$ | $CAM_2$ | $CO_1$ | $CO_2$ | $TEM_1$ | $TEM_2$ |
|---|---|---|---|---|---|---|
| 101001001010 | $(NID_1, 0)$ | $(NID_2, 0)$ | $(NID_3, 1)$ | $(NID_4, 1)$ | $(NID_5, 2)$ | $(NID_5, 2)$ |

FIG. 9

ACCESS CONTROL SYSTEM AND METHOD BASED ON HIERARCHICAL KEY, AND AUTHENTICATION KEY EXCHANGE METHOD THEREOF

FIELD OF THE INVENTION

The present invention generally relates to an access control system and method based on hierarchical key, and authentication key exchange method thereof.

BACKGROUND OF THE INVENTION

Wireless sensing network has grown from the massive deployment in military or environment surveillance to the household or personal use. For the sensing network to integrate into the household more easily, a home gateway is responsible for collecting the sensing network information and controlling the dependent variable changes. The home messenger acting as the home gateway has become the home sensing collection center.

When more households deploy sensing network elements and home gateway fro collecting information and the user is used to watch home gateway for obtaining the information of home sensing networks. It is important to consider how to provide an access control service on lots of sensing networks employed by the households, so that the user may know the sensing condition even when the user is not at the home messenger.

For a household, the deployed sensors may be divided into different priority categories. For example, the home surveillance sensor has the security degree higher than the temperature and humidity sensor. Also, different members of a household may be allowed to access different information. Therefore, a simple configuration of access control authority is in great demands.

To establish access control requires two fundamental factors, i.e., mutual authentication and access authorization. Authentication is to identify the identity (ID) of the user. The identification of the identity is the basis of any communication. However, even the server knows the identity of the user does not mean that the user may access freely. The user must also be authorized for the target to be accessed before accessing.

The most common secured access control method is to establish authentication and authorization mechanism for each session of the communication path. Cryptography usually uses a key to represent a physical entity, i.e., represent the identity. FIG. 1 shows an exemplary schematic view of an access control method to indicate a user intending to access information on a node in a remote sensing network.

As shown in step 110, a user 101 uses the user ID and password to request access control server (ACS) 103 provided by service provider for access to home gateway 105. At this point, ACS 103 checks the established access control list (ACL). Then the legitimacy of user 101 is checked, as shown in step 120. If legitimate, ACS 103 and home gateway 105 negotiate the session key of this session for user 101, as shown in step 130.

There are two objects of establishing a session key. The first object is to express that ACS 103 has confirmed the legitimacy of user 101 to access home gateway 105, and the second object is to use different key for different session, which helps to maintain the registered secret information will not go public on the communication network as well as providing consistent security quality for each communication.

After a session key is negotiated, user 101 may use the session key to request home gateway 105 for accessing a node i on a home sensing network 107, as shown in step 140. Home gateway 105 then checks whether user 101 has the authority to access node i as shown in step 150. If so, as shown in step 160, home gateway 105 inquires node i for secured communication and receives response information from node i, as shown in step 170. Home gateway 105 further uses the session key to encrypt the information before sending the information to user 101, as shown in step 180. In this manner, the user may safely access remote node i.

Taiwan Patent No. 1258964 disclosed a remote data access control method and system based on AAA mechanism. As shown in FIG. 2, in this access control method, a mobile user requests to the AAA server of local network for authentication (step 21), and each computes the same session key independently (step 22). After AAA server transmits session key and the ID of mobile user to the application server of local network (step 23), the mobile user also transmits the ID to the application server (step 24). Finally, based on the received ID, the application server uses the corresponding session key to establish the channel with the mobile user (step 25).

U.S. Patent Publication No. 2007/0006291 disclosed an authentication mechanism using one-time passwords with single sign-on authentication. As shown in FIG. 3, the authentication mechanism may comprise an authentication proxy server 320 and a user device 300. User device 300 connects to authentication proxy server 320 through a network 330. Through network 330, authentication proxy server 320 may communicate with a third-party authentication server (TPAS) 340 as well as a key distribution center 350. Key distribution center (KDC) 350 at least includes another authentication server (AS) 352 and a ticket granting server (TGS) 354 for updating the user's password and the request, as well as receiving granting ticket and service ticket. The ticket granting server of the authentication mechanism will add loads to the service provider.

SUMMARY OF THE INVENTION

The disclosed exemplary embodiments of the present invention may provide an access control system and method based on hierarchical key, and authentication key exchange method thereof.

In an exemplary embodiment, the disclosed relates to an access control system based on hierarchical key, comprising an access control server, a home gateway and a plurality of sensor nodes deployed in a home network. The access control server is configured with the user access control rights and authorization verifier, and stores the related information of user password and access rights. The home gateway records access rights and rights key based on a hierarchical key structure. When a user logins in to the access control server to request access, the user and the home gateway use the exchange of a ticket and a token issued by the access control server to establish a one-time session key to allow the user to access the information on the plurality of sensor nodes.

In another exemplary embodiment, the disclosed relates to an access control method based on hierarchical key. The access control method comprises: establishing a hierarchical key structure in a home gateway; establishing user access control rights and authorization verifier in an access control server; when a user logging in to the access control server to request access, the access control server using the authorization verifier corresponding to the user to issue a ticket and a token; and the user and the home gateway establish a one-time communication key through the exchange of the ticket and the token to allow the user to access the information on the plural deployed sensor nodes in a home network.

Yet in another exemplary embodiment, the disclosed relates to an authentication key exchange method, applicable to remote access authentication for a user. The authentication key exchange method comprises: the user providing a unique ID, and a hidden random number m to an access control server; based on the unique ID and hidden random number m, the access control server finding a corresponding rights verifier, and using random number m and another random number y to generate a ticket pair $(\omega, \mu)$ and a token $\beta$, transmitting token $\beta$ to a corresponding home gateway; after receiving acknowledgement from the home gateway, the access control server transmitting the ticket pair to the user; and through m, $\mu$, $\beta$ and an non-invertible operation, the user confirming the identity of the access control server and receiving ticket $\omega$.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 9 shows exemplary contents of a key management table of home gateway according to FIG. 7, consistent with certain disclosed embodiments of the present invention.

DETAILED DESCRIPTION OF THE PREFERRED EMBODIMENTS

The disclosed embodiments of the present invention provide an access control system and method based on hierarchical key, and an authentication key exchange method thereof. The access control mechanism may be applied to a home gateway. For example, the access control mechanism may be linked with an access control server, a home gateway and home sensing network devices so that the home information administrator may establish user access control policy through the access control server so as to enable the user access the authorized sensing information through the assistance of the access control server.

With the home gateway, the home information administrator must register the administrator's ID and password, and the basic connection information and security communication key of the home gateway to the access control server of the service provider to establish basic security trust point. The registration information at least includes identification information to identify the home gateway, such as serial number and the IP address of the home gateway, so that the access control server may know the basic information of the home gateway. Also, depending on the requirement, the registration information may include the information required for secured communication between the access control server and the home gateway manager, such as home information administrator's ID, password and key.

Figure 1:
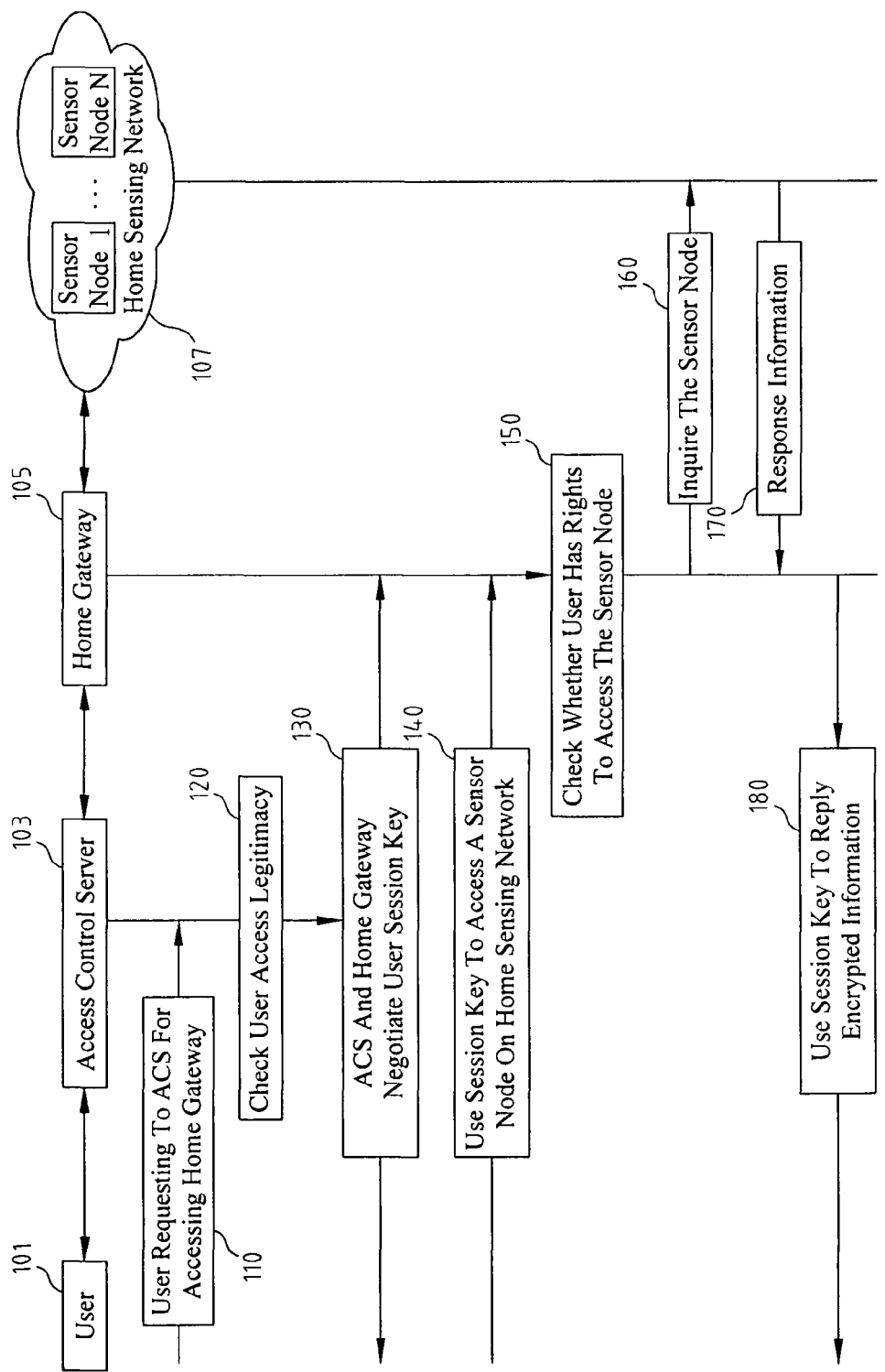
FIG. 1 shows an exemplary schematic view of an access control method.
Figure 2:
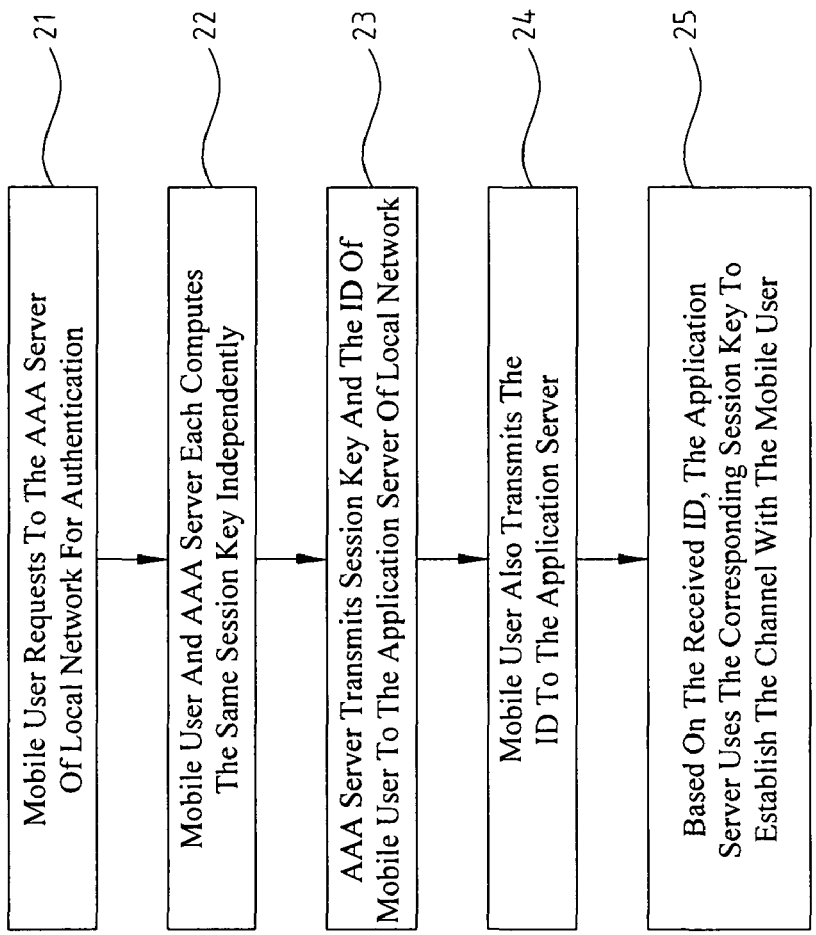
FIG. 2 shows an exemplary schematic view of a remote access control method.
Figure 3:
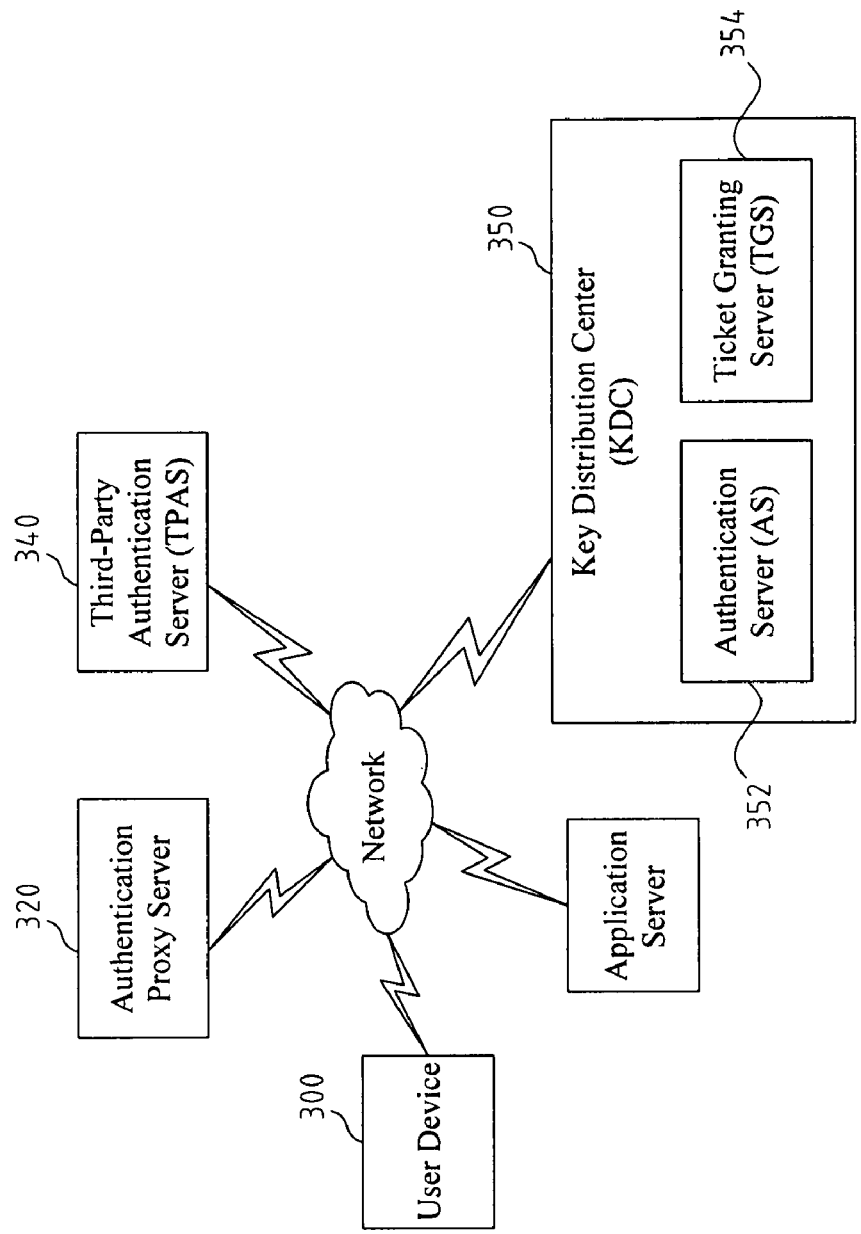
FIG. 3 shows a schematic view of an authentication mechanism using one-time passwords with single sign-on authentication.
Figure 4:
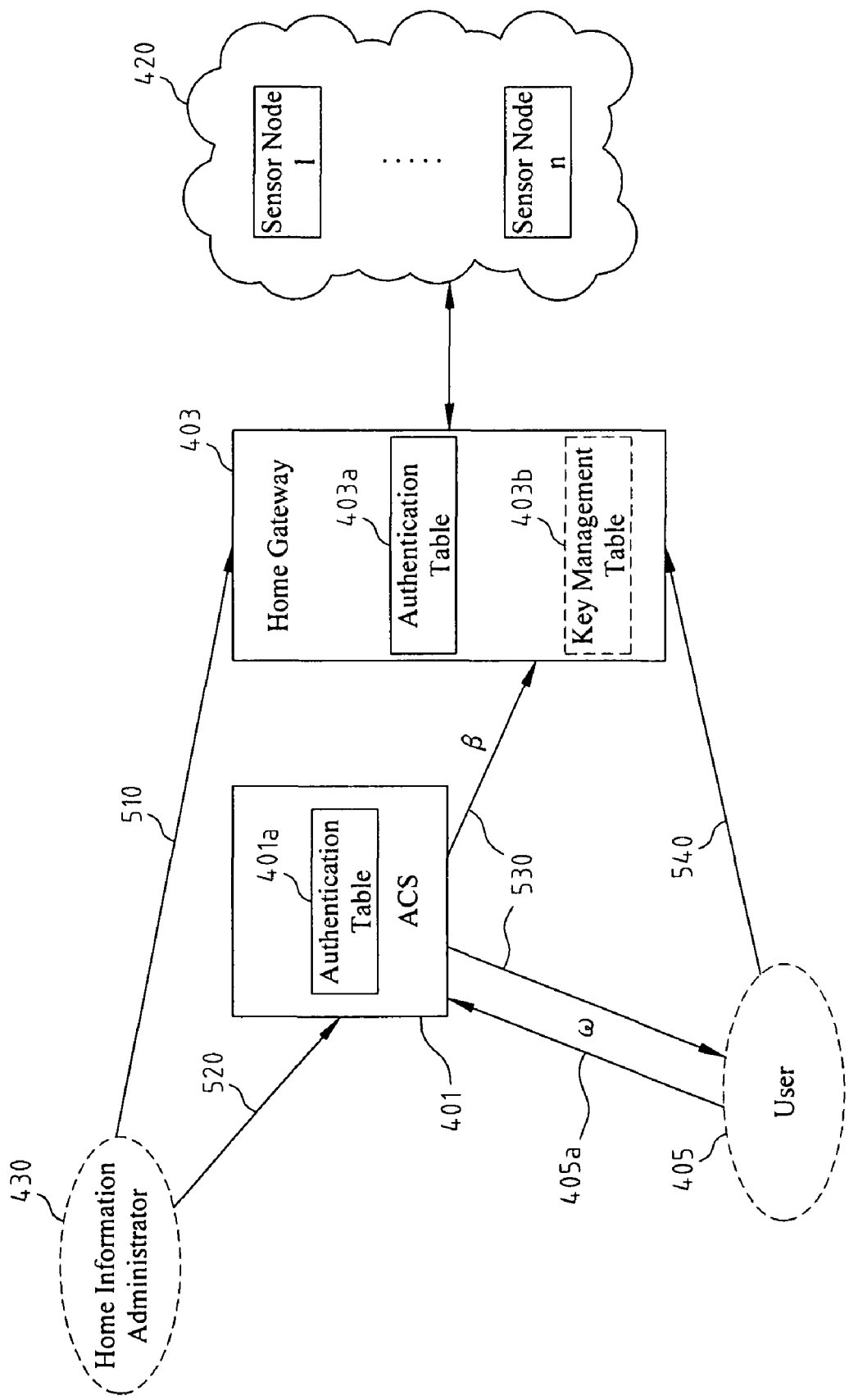
FIG. 4 shows a schematic view of an exemplary access control system based on hierarchical key, consistent with certain disclosed embodiments of the present invention.
Figure 5:
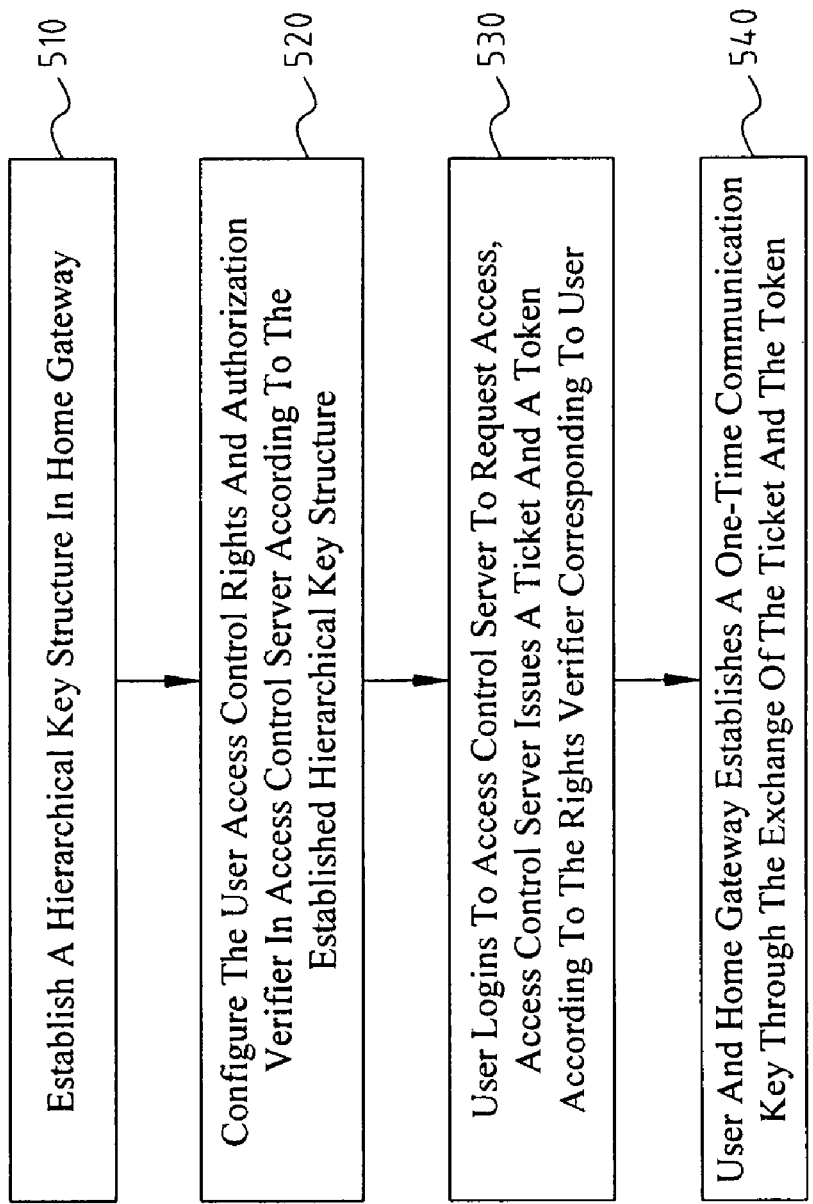
FIG. 5 shows an exemplary operation flow of the access control system, consistent with certain disclosed embodiments of the present invention.

FIG. 4 shows a schematic view of an exemplary access control system based on hierarchical key, consistent with certain disclosed embodiments of the present invention. As shown in FIG. 4, the access control system may comprises an access control server 401, a home gateway 403, and a plurality of sensor nodes 1-*n* deployed in a sensing network 420. FIG. 5 shows an exemplary operation flow of the access control system, consistent with certain disclosed embodiments of the present invention.

The following description refers to both FIG. 4 and FIG. 5. When home information administrator 430 registers the related information of home gateway 403 to access control server 401, home information administrator 430 may use home gateway 403 as the starting point for establishing access control and establish a hierarchical key structure 403*a* in home gateway 403, as shown in step 510, so that sensing network 420 may conveniently perform key management and rights classification.

After that, home information administrator 430 configures the user access control rights and authorization verifier in access control server 401 according to the established hierarchical key structure 403*a*, as shown in step 520; and keeps the user password related information and access rights information in access control server 401.

As shown in step 530, when user 405 logins in to access control server 401 to request access 405*a*, access control server 401 issues a ticket $\omega$ and a token $\beta$ according to the rights verifier corresponding to user 405.

As shown in step 540, user 405 and home gateway 403 establishes a one-time communication key through the exchange of the ticket and the token so as to allow user 405 to access information on sensor nodes 1-*n*.

Home gateway 403 may have a key management table 403*b* to record the access rights established according to hierarchical key structure 403a, the ID code and corresponding access rights of a plurality of sensor nodes, and highest priority key. Access control server 401 and home gateway 403 each may have an authentication table, i.e., authentication table 401a and authentication table 403c. Authentication table 401a of access control server 401 records the registered user ID (UID), user password and related verifier, and related verifier of user rights. Authentication table 403c of home gateway 403 is a rights key table for recording registered UID and related information of user rights, such as encrypted user rights.

Figure 6:
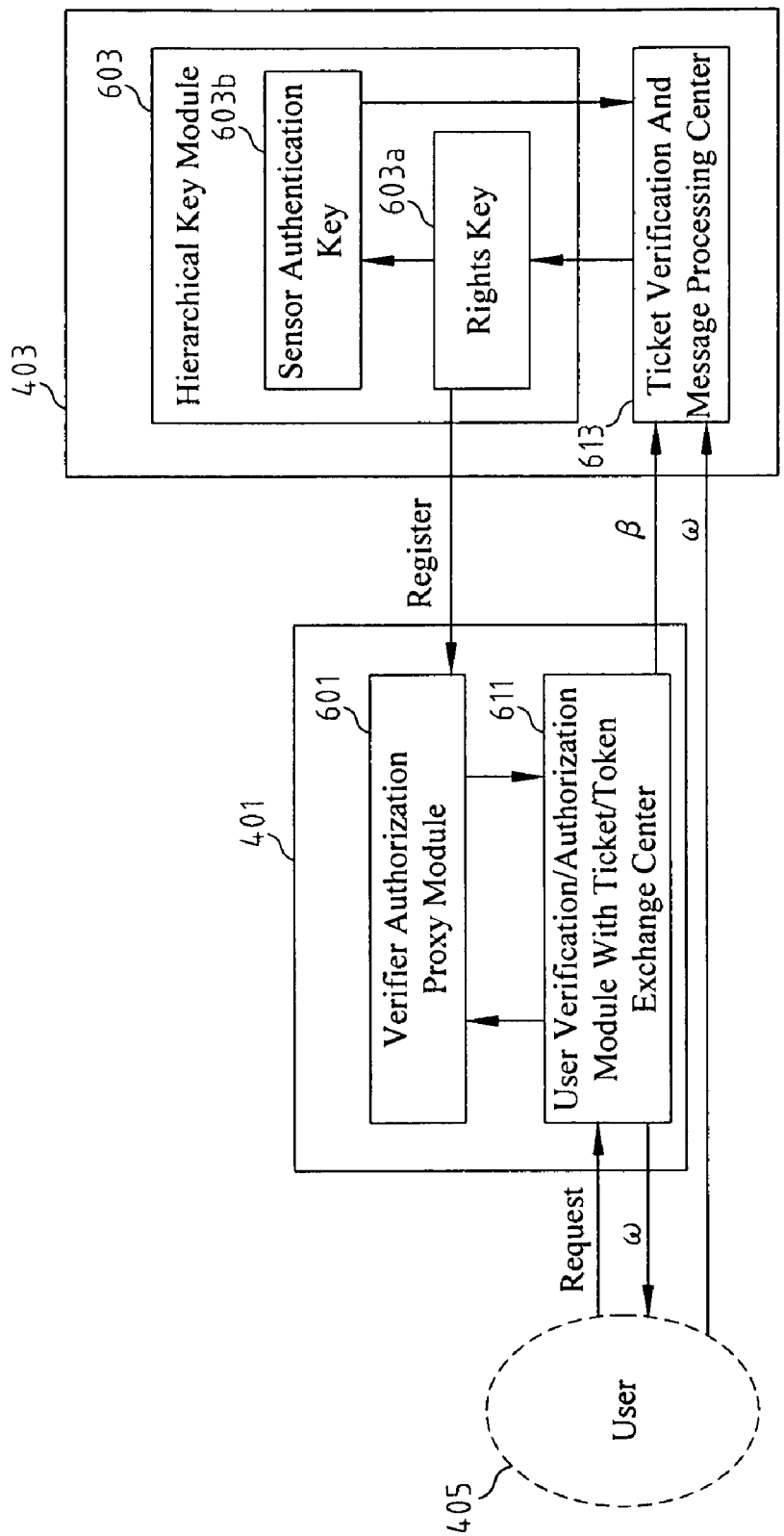
FIG. 6 shows an exemplary schematic view of the elements and the access control service of the access control server and the home gateway, consistent with certain disclosed embodiments of the present invention.

FIG. 6 shows an exemplary schematic view of the elements and the access control service of the access control server 401 and the home gateway 403, consistent with certain disclosed embodiments of the present invention. Referring to FIG. 6, home gateway 403 includes a hierarchical key module 603 and a ticket verification and message processing center 613. Hierarchical key module 603 establishes rights key 603a and sensor authentication key 603b. Rights key 603a is for access control configuration and sensor authentication key 603b is for encryption of information communicated between home gateway 403 and sensor node. Ticket verification and message processing center 613 is responsible for authenticating the user logging in with the ticket.

Access control server 401 includes a verifier authorization proxy module 601 and a user verification/authorization module with ticket/token exchange center 611. Verifier authorization proxy module 601 enables the home information administrator to configure the access rights of the users and stores the access rights verifier. User verification/authorization module with ticket/token exchange center 611 coordinates and establishes the session key for the user and the home gateway so that legitimate user may let the home gateway know the legitimacy of the user through ticket and token comparison when requesting access authorization from the home gateway.

Therefore, in the access control mechanism based on hierarchical key of the present invention, home information manager 430 is responsible for constructing the overall access control policy, including establishing hierarchical key, assigning sensor node key for sensing network, and configuring access control rights. User 405 may use any remote device to access information on any sensor node on a sensing network. Access control server 401 needs to authenticate the user login ID. Access control server 401 stores access rights information and the related information of user password, and may establish a session key to be used as a shared key between the user and home gateway 403. Home gateway 403 may collect the information of sensor nodes 1-n on sensing network 420, and then displays the information on a screen. Home gateway 403 needs to perform initialization and authentication on sensor nodes of sensing network 420. Sensor nodes may detect the changes in the environment, such as temperature, humidity, real-time video surveillance, and so on, and transmit the information through other nodes on the sensing network to home gateway 403.

Sensor nodes on sensing network 420 may be grouped into different types according to the environmental variables detected, such as three different types for detecting temperature, humidity and real-time video surveillance, respectively. In this manner, the user has a set of three ID/passwords for identification.

Figure 7:
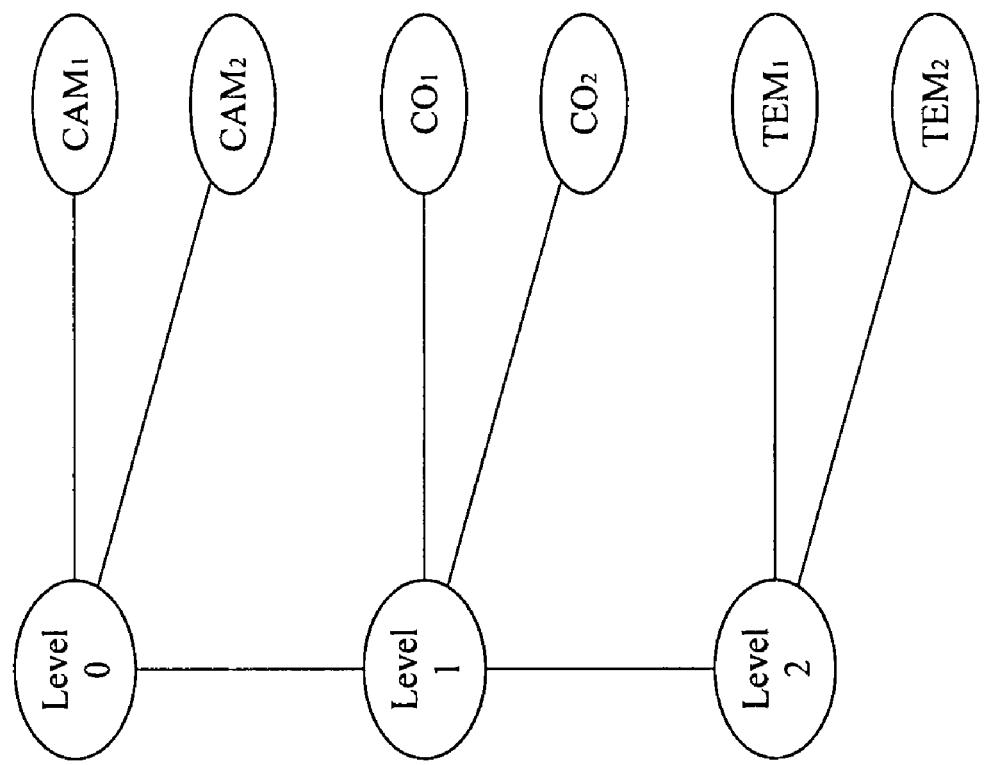
FIG. 7 shows an exemplar established by a hierarchical key structure, consistent with certain disclosed embodiments of the present invention.

The following further explains the establishing of hierarchical key structure and the operation of FIG. 5. FIG. 7 shows an exemplar established by a hierarchical key structure, consistent with certain disclosed embodiments of the present invention. In the exemplar of FIG. 7, there are 6 sensor nodes on the sensing network, classified as three types of sensor nodes, such as sensor nodes $CAM_1$ and $CAM_2$ video surveillance for sensing surrounding environment, sensing nodes $CO_1$ and $CO_2$ for sensing carbon-monoxide (CO) and carbon-dioxide ($CO_2$), and sensor nodes $TEM_1$ and $TEM_2$ for sensing temperature. Each sensor node has a unique node identifier NID, and the NID for the 6 sensor nodes are $NID_1$-$NID_6$, respectively. There are three levels in the hierarchical key structure, marked as level 0, level 1, and level 2, respectively. Each level has a rights key, and the level rights key $K_{LV}$ for each level is $K_0$, $K_1$ and $K_2$, respectively.

Sensor nodes $CAM_1$ and $CAM_2$ belong to level 0, sensing nodes $CO_1$ and $CO_2$ belong to level 1 and sensor nodes $TEM_1$ and $TEM_2$ belong to level 2. Each sensor node has own verification key NK, and NK for each sensor node is marked as $NK_1$-$NK_6$, respectively.

Figure 8:
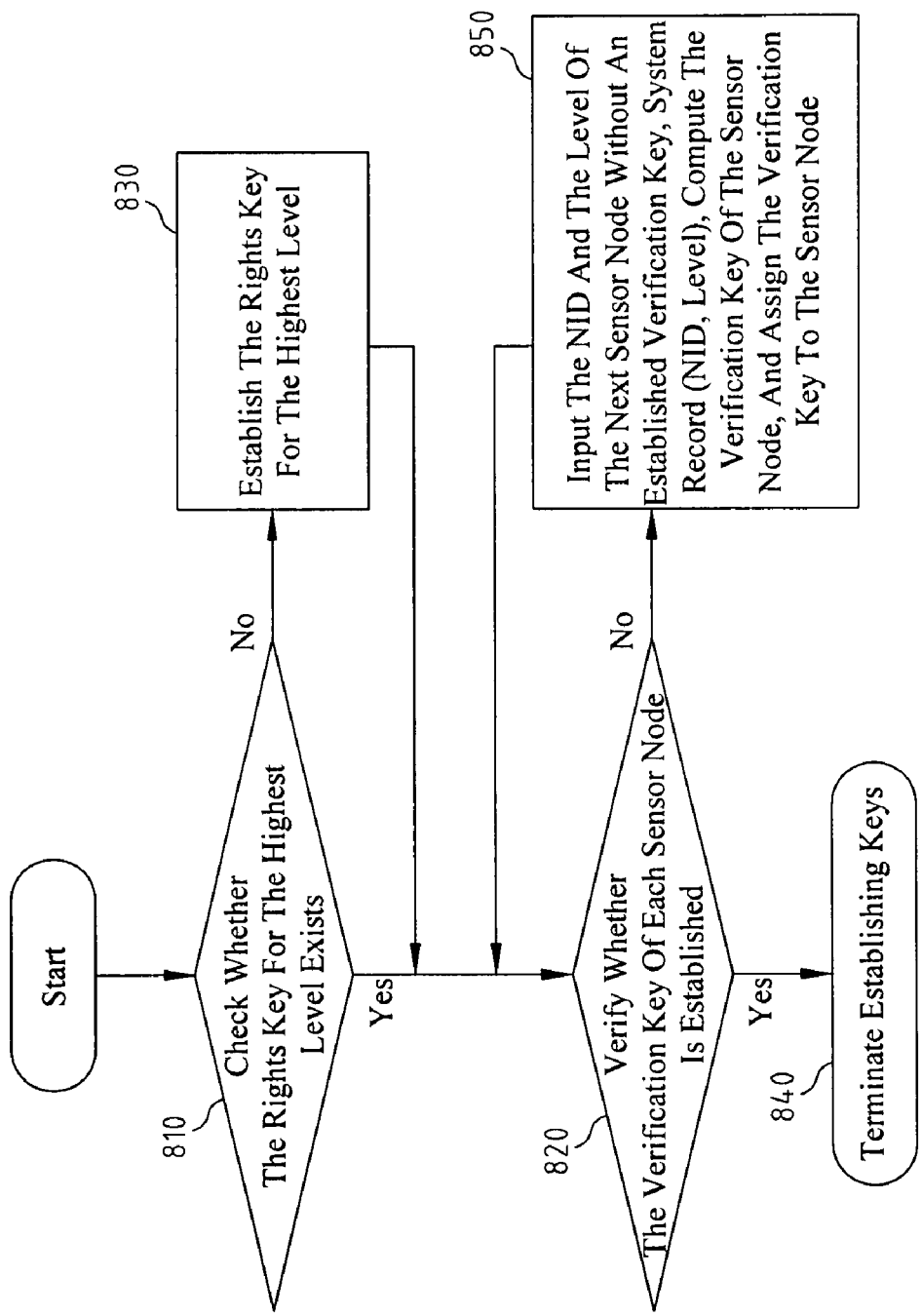
FIG. 8 shows an exemplary flowchart illustrating how to establish a hierarchical key structure, consistent with certain disclosed embodiments of the present invention.

According to the establishing of hierarchical key structure of the present invention, the rights key of lower level, such as level 1, may be generated by the rights key of higher level, such as level 0, and the verification key of each sensor node may be generated from the rights key of the level for the sensor node and the NID of the sensor node. FIG. 8 shows an exemplary flowchart illustrating how to establish a hierarchical key structure, consistent with certain disclosed embodiments of the present invention.

Referring to the exemplary flowchart shown in FIG. 8, as shown in step 810, whether the rights key for the highest level exists is checked. If so, step 820 is to verify whether the verification key of each sensor node is established; otherwise, step 830 is to establish the rights key for the highest level and return to step 820.

When the verification key of each sensor node is established, as shown in step 840, the key establishing process is terminated; otherwise, as shown in step 850, the NID and the level of the next sensor node without an established verification key, system record (NID, level), is inputted, the verification key of the sensor node is computed, and the verification key is assigned to the sensor node, and return to step 820.

FIG. 9 shows exemplary contents of a key management table of home gateway 403 according to FIG. 7, consistent with certain disclosed embodiments of the present invention. As shown in FIG. 9, key management table only records the rights key 101001001010 of the highest level in the hierarchical key structure and the NID of each node. The NK of each sensor node may be computed from the key management table. The verification key of each sensor node is computed by home information administrator 430 during the node initialization, and used as an encryption key for information exchange between home gateway 403 and sensor node. The relation between rights key or verification key is established with a non-invertible function, such as hash function.

The following describes how to generate rights key of each level and verification key of each sensor node using the key management table of FIG. 9 as an example. In FIG. 9, rights key $K_0$ of level 0 (highest level) is 101001001010. Sensor nodes $CAM_1$ and $CAM_2$ of level 0 have verification keys $NK_1$=Hash($NID_1$, $K_0$) and $NK_2$=Hash($NID_2$, $K_0$), respectively. Rights key $K_1$ of level 1 is obtained from Hash($K_0$), and the verification keys of sensing nodes $CO_1$ and $CO_2$ are $NK_3$=Hash($NID_3$, $K_1$) and $NK_4$=Hash($NID_4$, $K_1$), respectively. Similarly, rights key $K_2$ of level 2 is obtained from Hash($K_1$), and the verification keys of and sensor nodes $TEM_1$ and $TEM_2$ are $NK_5$=Hash($NID_5$, $K_2$) and $NK_6$=Hash($NID_6$, $K_2$), respectively. Hence, the key management table of home gateway 403 only needs to record the rights key of the highest level and NID of each sensor node. Because the key management table of the home gateway does not need to record the verification key of each sensor node and rights key for each level, the space is saved and security improved.

In addition, the user may use a unique ID and password on a home gateway to access information of a plurality of sensor nodes deployed on the sensing network. Similarly, the user may use the same ID and password for a plurality of home gateways so as to reduce the load of access control server 401 in coordinating session keys.

Figure 10:
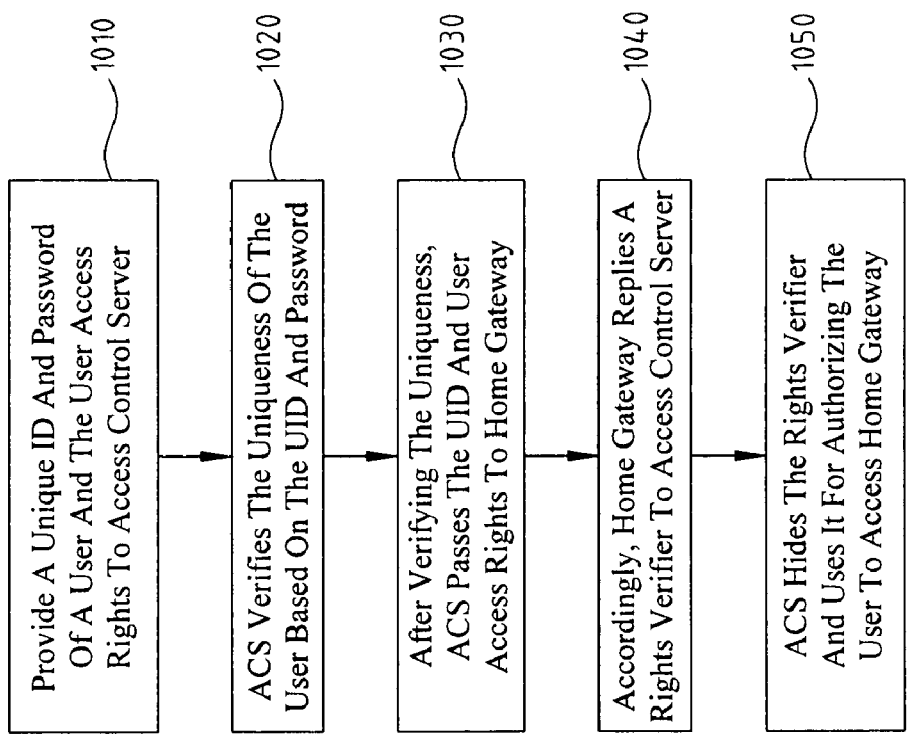
FIG. 10 shows an exemplary flowchart illustrating how to establish user access rights, consistent with certain disclosed embodiments of the present invention.

When home hierarchical key is configured and deployed to sensor nodes, the following describes how to establish user ID, password and access rights with access control server based on the hierarchical key. FIG. 10 shows an exemplary flowchart illustrating how to establish user access rights, consistent with certain disclosed embodiments of the present invention.

Referring to FIG. 10, step 1010 is to provide a unique ID (UID) and password of a user and the user access rights to access control server 401. Step 1020 is for access control server 401 to verify the uniqueness of the user based on the UID and password. After verifying the uniqueness, step 1030 is for access control server 401 to pass the UID and user access rights to home gateway 403. Accordingly, step 1040 is for home gateway 403 to reply a rights verifier to access control server 401. Step 1050 is for access control server 401 to hide the rights verifier and use it for authorizing the user to access home gateway 403.

In step 1040, home gateway 403 may use a non-invertible function to compute the rights verifier and to store the matching of UID and the rights verifier in authentication table 403c. In step 1050, access control server 401 may use a non-invertible function to hide the rights verifier and stores the hidden verifier into authentication table 401a.

Figure 11:
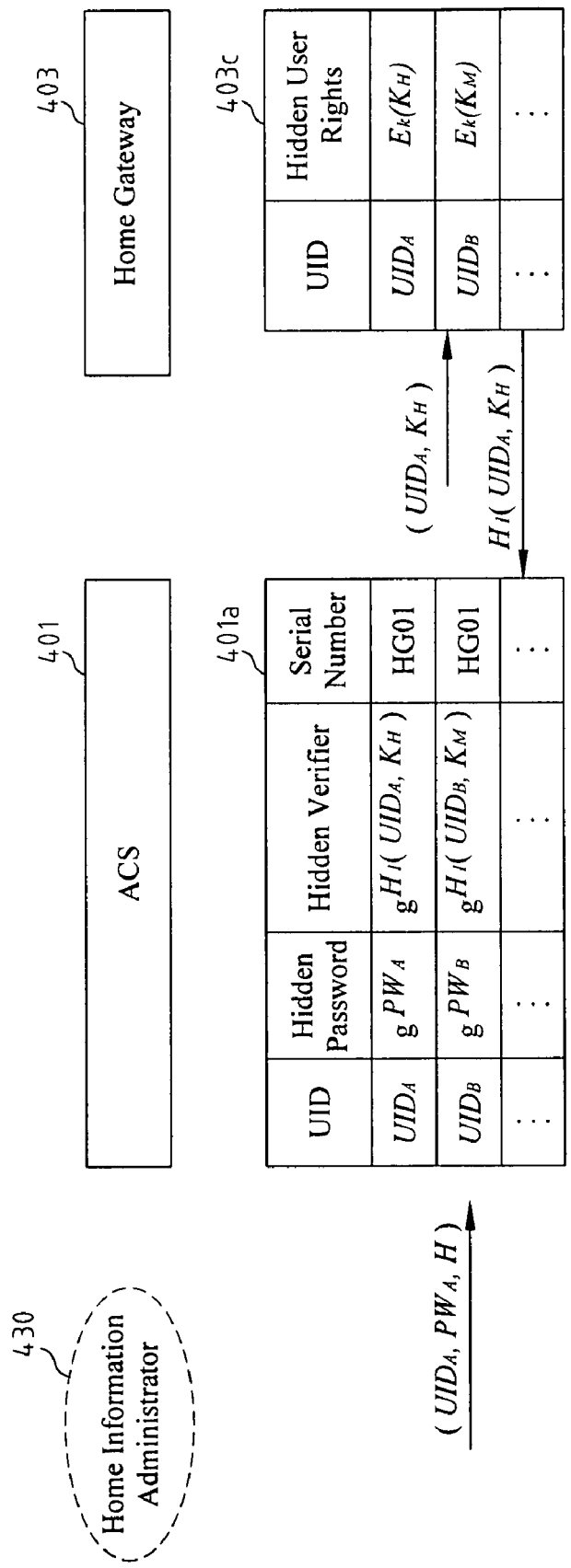
FIG. 11 shows an exemplar illustrating how to establish user access rights, consistent with certain disclosed embodiments of the present invention.

FIG. 11 shows an exemplar illustrating how to establish user access rights, consistent with certain disclosed embodiments of the present invention. Referring to FIG. 11, user 450 may login to access control server 401 with the UID and password of home information administrator 430 obtained through registration so that access control server 401 knows home gateway 403 intends to register a user. The home information administrator inputs the unique $UID_A$ and password $PW_A$ of user A, and user rights H to access control server 401. After access control server 401 receives the input, the uniqueness of the user is verified. If user A already exists, access control server 401 will add home gateway 403 currently used as user registration to the $UID_A$ of user A.

After verifying the uniqueness, access control server 401 passes UID and access rights H to home gateway 403. Home gateway 403 updates its authentication table 403c accordingly, and passes the related verifier of the rights key corresponding to the user access rights to access control server 401. The verifier is obtained by performing a one-way computation, such as Hash function $H_1$, on UID and rights key $K_H$ corresponding to the user access rights. Access control server 401, after receiving the verifier, stores the related information in authentication table 401a. The related information includes, such as, user ID, hidden password, serial number of home gateway, and the hidden verifier corresponding to the verifier. The related information is used in future authentication by access control server 401 when the user access information from home gateway.

After the user access rights are established, the user only needs to remember the unique ID and password for future remote access authentication. Access control server 401 only needs to store the matching user ID/password and verifier, instead of using brutal force method to establish access control table.

After accomplishing the establishing of user access rights, when a user remotely logs in to access control server 401 for requesting an access, access control server 401 uses the verifier corresponding to the user to issue an access authorization ticket and uses a token to notify home gateway 403 of the user access request. The user and home gateway 403 may use the ticket and the token to compute the session key for the present session for one-time encryption and authentication of communication information. In other words, when the user remotely logs in to access control server 401 for access, the user remote access is divided into two stages. The first stage is the user requests authentication and authorization from access control server 401, and the second stage is the user and home gateway 403 establish communication keys. The following describes the two stages.

Figure 12:
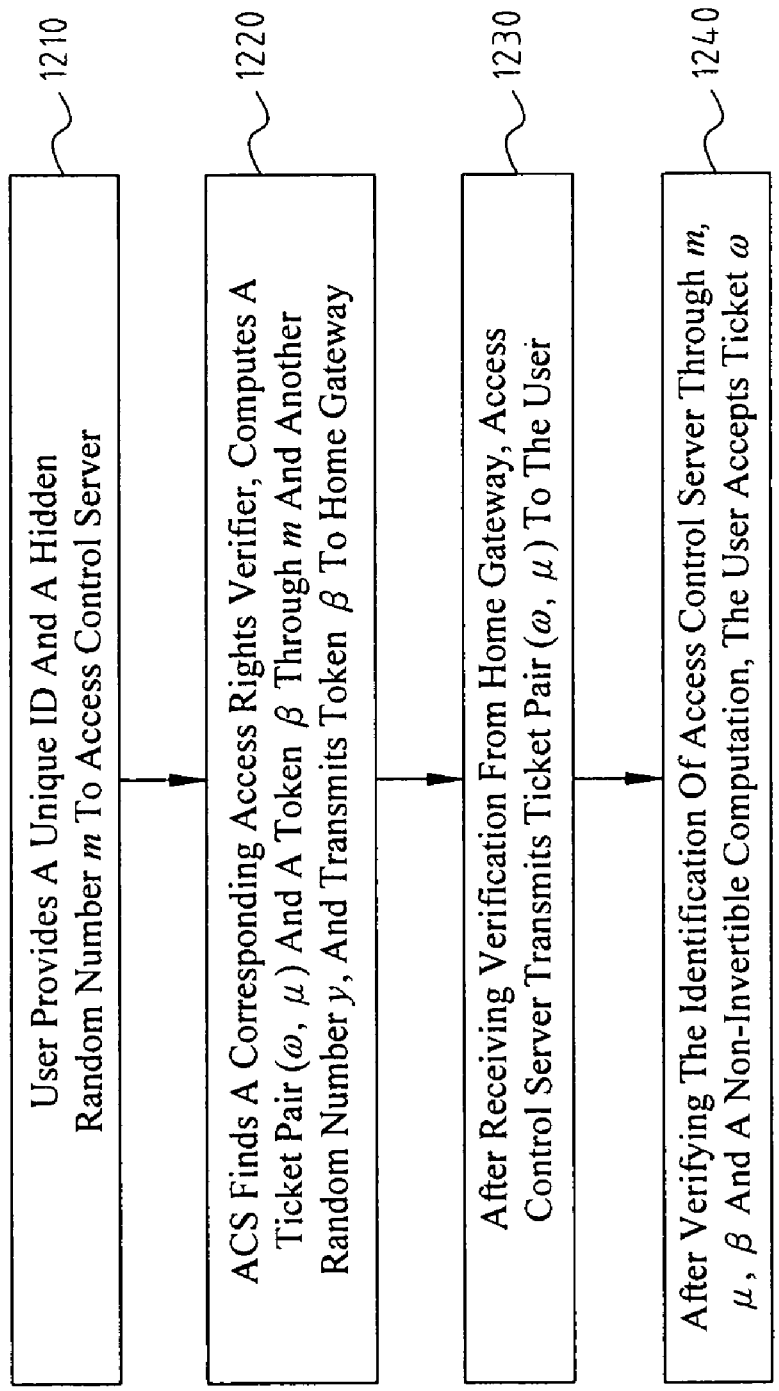
FIG. 12 shows an exemplary flowchart illustrating the operation of an authentication key exchange method when a user requests authentication/authorization to the access control server, consistent with certain disclosed embodiments of the present invention.

In the first stage, the relation between the user and the access control server is entirely based on the authentication key exchange protocol to realize the user authentication/authorization. FIG. 12 shows an exemplary flowchart illustrating the operation of an authentication key exchange method when a user requests authentication/authorization to the access control server, consistent with certain disclosed embodiments of the present invention.

As shown in FIG. 12, the user provides a unique ID (UID) and a one way computed number m from hidden random number x to access control server 401, as shown in step 1210. Accordingly, access control server 401 finds a corresponding access rights verifier, computes a ticket pair ($\omega$, $\mu$) and a token $\beta$ through m and another random number y, and transmits token $\beta$ to home gateway 403, as shown in step 1220. After receiving verification from home gateway 403, access control server 401 transmits ticket pair ($\omega$, $\mu$) to the user, as shown in step 1230. After verifying the identification of access control server 401 through m, $\mu$, $\beta$ and a non-invertible computation, the user accepts ticket $\omega$, as shown in step 1240.

Figure 13:
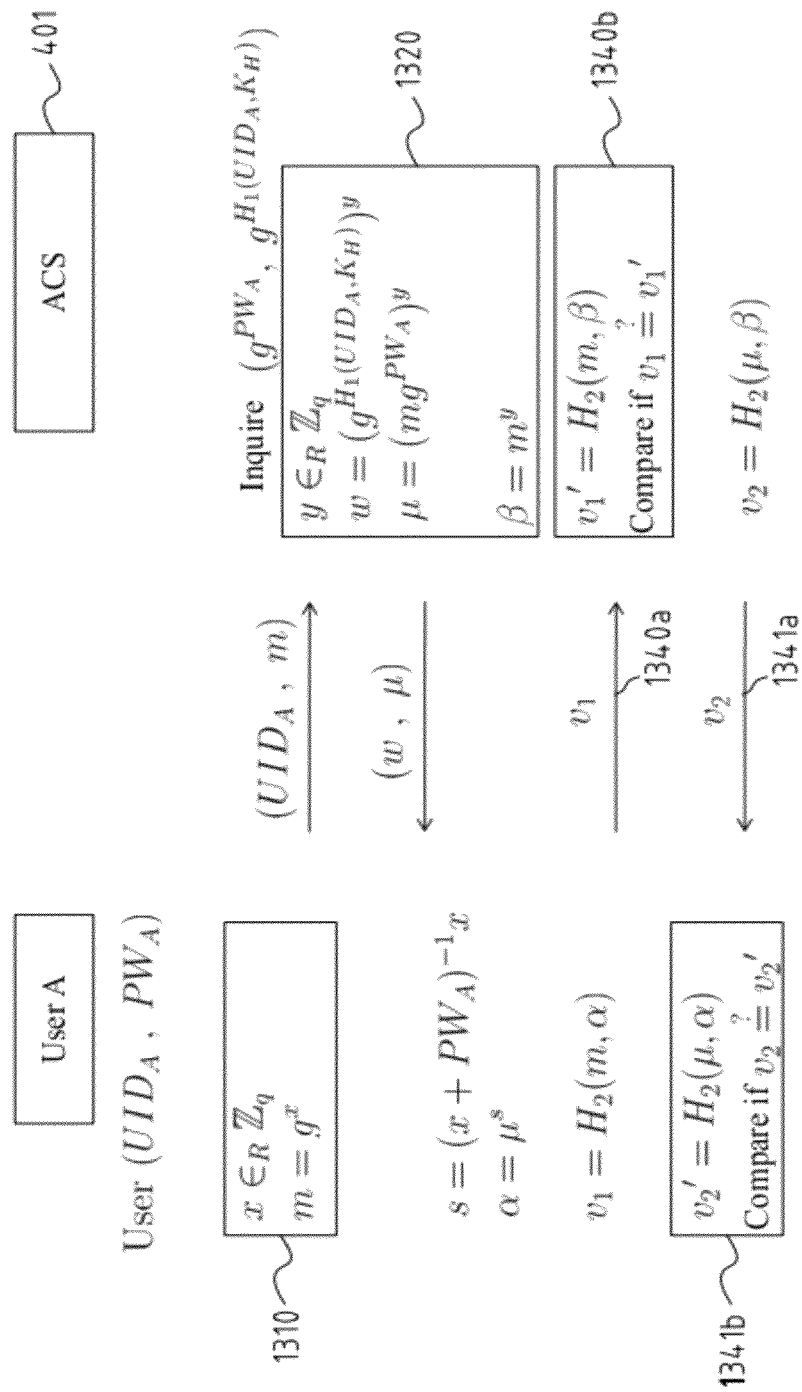
FIG. 13 shows an exemplar illustrating how to accomplish authentication/authorization between the user and the access control serve through the establishment of mathematic models, consistent with certain disclosed embodiments of the present invention.

According to the operation flow of FIG. 12, FIG. 13 shows an exemplar illustrating how to accomplish authentication/authorization between the user and the access control serve through the establishment of mathematic models, consistent with certain disclosed embodiments of the present invention. In the exemplar of FIG. 13, user A uses $UID_A$ and $PW_A$ to login to access control server 401, marked as 1310. Hidden random number m of step 1210 of FIG. 12 may be constructed with the following model: randomly selecting an x from a $Z_p^*$ sub-group G, letting m as $g^x$, where $Z_p^*$ indicating the set of all elements mutually primed to p in modulus p, and g is a constructing element in G.

The access rights verifier of step 1220 may be found in authentication table 401a of access control server 401 through lookup. The corresponding verifier found in authentication table 401a may be used with another random number y randomly selected in sub-group G to construct a mathematic model to compute the ticket pair ($\omega$, $\mu$). Access control server 401 may also obtain token $\beta$ through a mathematic model $\beta=m^y$. The mathematic model is marked as 1320.

After access control server 401 transmits ticket pair ($\omega$, $\mu$) to the user A, user A uses X and password to compute s, assigns $\alpha=\mu^s$, and transmits $v_1=H_2(m, \alpha)$ to access control server 401, marked as 1340a. Access control server 401 check whether $v_1$ against $v'_1=_2(m, \beta)$ or not, marked as 1340b. If $v_1=v'_1$ is true, it means that access control server 401 authenticates the identity of user A. Access control server 401 then computes $v_2=H_2(\mu, \beta)$ and transmits to user A, marked as 1341a. User A computes $v'_2=H_2(\mu, \alpha)$ and check whether $v_2=v'_2$ or not, marked as 1341b. If $v_2=v'_2$ is true, it means that user A authenticates the identity of access control server 401. In this manner, user A and access control server 401 accomplish mutual authentication, and user A also receives ticket ω from access control server 401.

In other words, the user and the access control server use the authenticated key exchange protocol as a base to realize the user remote access.

Figure 14:
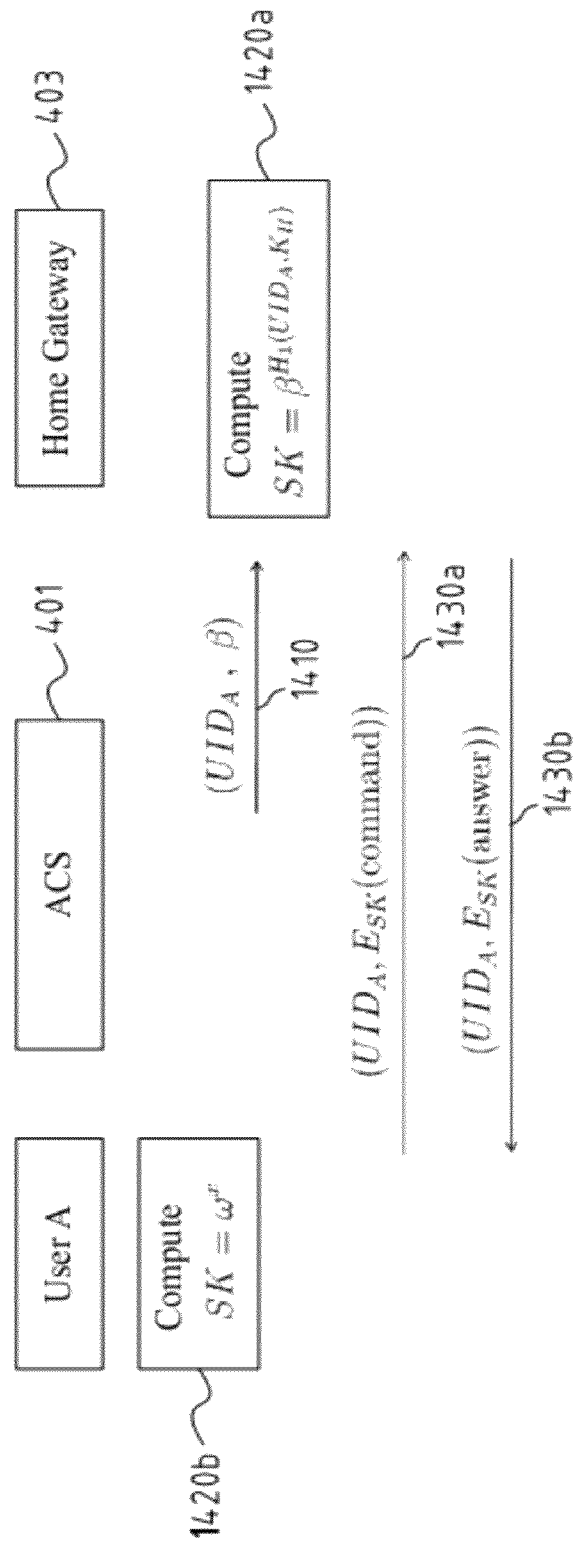
FIG. 14 shows an exemplary schematic view illustrating the operation of establishing communication key between the user and the home gateway, consistent with certain disclosed embodiments of the present invention.

After accomplishing mutual authentication between user A and access control server 401 and user A receiving ticket ω from access control server 401, the user remote access enters the second stage; that is, the stage for the user and home gateway 403 to establish communication key. FIG. 14 shows an exemplary schematic view illustrating the operation of establishing communication key between the user and the home gateway 403, consistent with certain disclosed embodiments of the present invention.

Referring to FIG. 14, access control server 401 transmits token pair $(UID_A, \beta)$ to home gateway 403, marked as 1410. Home gateway 403 computes session key SK by $SK = \beta_1^{H(UID_A, K_H)}$, marked as 1420a. User A may also use ticket ω from access control server 401 and selected random number x to compute $SK = \omega^x$, marked as 1420b. According to the above computation, the session keys established by user A and home gateway 403 are the same.

Then, marked as 1430a, the command message transmitted by user A to home gateway 403 will use session key SK as encryption key, represented as $E_{sk}$(command). Similarly, marked as 1430b, the answer from home gateway 403 to user is also encrypted with SK as key, represented as $E_{sk}$(answer). In this manner, the secured communication channel is established between the user and the home gateway.

It is worth noting that the ticket and the token generated by the access control server in the present invention may be transmitted without encryption. Even when the hacker has ticket ω, the hacker cannot correctly compute the session key. Hence, the disclosed exemplary embodiments of the present invention may reduce the load in deployed system.

In summary, the disclosed exemplary embodiments of the present invention provide an access control system and method based on hierarchical key, and an authentication key exchange method thereof. The access control mechanism enables the home gateway to provide different security levels for a plurality of sensor nodes in a sensing network through a hierarchical key structure, and flexibly classify and manage home sensing network keys. Based on the hierarchical key structure, the access control server needs not to store home keys directly. Instead, the home gateway may simply configure the user access rights on access control server to avoid the leakage of information stored on the access control server. The user may use the unique ID and password to remotely access information of a plurality of sensor nodes through a home gateway. Similarly, the user may use a group of IDs/passwords to access information through a plurality of home gateways to reduce the computation load of access control server when coordinating session keys.

In the exemplary embodiments of the present invention, the user and the access control server use authentication key exchange protocol as a base to realize the user remote access and reduce the load of deployed system.

Although the present invention has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An access control system based on hierarchical key, comprising:
   an access control server which configures access rights and authorization verifier for users and stores related information of user password and information of user access rights;
   a home gateway which records user access rights and rights key established according to a hierarchical key structure; and
   a plurality of sensor nodes deployed in a sensing network; wherein when a user logs into said access control server for requesting an access, said user and said home gateway establish an one-time communication key through exchanging a ticket and a token issued by said access control server to allow said user accessing information of said plurality of sensor nodes;
   wherein said home gateway checks whether a rights key of the highest level exists or not;
   if existing, verifies whether the authentication key of each sensor node is established or not;
   if non-existent, establishes said rights key of the highest level and verifies whether an authentication key of each sensor node is established or not; and
   if said authentication key of each said sensor node is established, terminates establishing key;
   otherwise, inputs identifier and level of a sensor node to be established authentication key, and computes the authentication key of said sensor node and assigns the authentication key to said sensor node, and then returns to said step of verifying an authentication key of each said sensor node is established or not.

2. The system as claimed in claim 1, wherein said home gateway further includes a key management table for recording user access rights established according to said hierarchical key structure, identities of said plurality of sensor nodes and corresponding access rights, and a highest priority key.

3. The system as claimed in claim 1, wherein said access control server further includes a first authentication table for recording registered user identifiers, user password related verifiers, and user rights related verifiers.

4. The system as claimed in claim 1, wherein said home gateway further includes a second authentication table for recording registered user identifiers and user access rights.

5. The system as claimed in claim 1, wherein said home gateway further includes:
   an hierarchical key module which establishes rights keys and sensor node keys, said rights keys are for access control configuration and said sensor node keys are for encrypting information transmitted between said home gateway and said sensor nodes; and
   a ticket verification and message processing center which verifies a user with a ticket to login.

6. The system as claimed in claim 1, wherein said access control server further includes:
   a verifier authorization proxy module which configures user access rights and stores verifier of said user access rights; and
   a user verification/authorization module with ticket/token exchange center which coordinates and establishes a session key for a user and said home gateway so that a legitimate user is able to let said home gateway know the legitimacy of said legitimate user through exchanging said ticket and said token and further comparison when requesting access authorization from said home gateway.

7. The system as claimed in claim 1, wherein in said hierarchical key architecture, a rights key for a lower level is generated from a rights key of a higher level.

8. The system as claimed in claim 1, wherein the authentication key of each sensor node of said plurality of sensor nodes is generated by the rights key of the level for said sensor node and said sensor node's identifier.

9. An access control method based on hierarchical key, comprising:
    establishing a hierarchical key structure in a home gateway;
    establishing user access rights and authorization verifier in an access control server;
    when a user logging in to said access control server for requesting an access, said access control server issuing a ticket and a token according to an authorization verifier corresponding to said user; and
    said user and said home gateway exchanging said ticket and said token to establish an one-time communication key to allow said user to access information of a plurality of sensor nodes deployed in a home sensing network;
    checking whether a rights key of the highest level exists or not;
    if existing, verifying whether the authentication key of each sensor node is established or not;
    if non-existent, establishing said rights key of the highest level and verifying whether an authentication key of each sensor node is established or not; and
    if said authentication key of each said sensor node is established, terminating establishing key;
    otherwise, inputting identifier and level of a sensor node to be established authentication key, and computing the authentication key of said sensor node and assigning the authentication key to said sensor node, and then returning to said step of verifying an authentication key of each said sensor node is established or not.

10. The method as claimed in claim 9, wherein in said hierarchical key structure, a rights key for a lower level is generated from a rights key of a higher level.

11. The method as claimed in claim 10, wherein the relation for establishing said rights keys is computed with a non-invertible function.

12. The method as claimed in claim 9, wherein the authentication key of each sensor node of said plurality of sensor nodes is generated by the rights key of the level for said sensor node and said sensor node's identifier.

13. The method as claimed in claim 12, wherein the relation for establishing said authentication keys is computed with a non-invertible function.

14. The method as claimed in claim 9, wherein user access rights in said access control server at least includes:
    providing a unique identifier, a password and a user access rights for a user to said access control server;
    said access control server verifying uniqueness of said unique identifier and said password;
    after verifying uniqueness of said user, said access control server passing said identifier and said user access rights to said home gateway;
    said home gateway replying a rights verifier to said access control server; and
    said access control server hiding said rights verifier for using in authorizing said user accessing said home gateway.

15. The method as claimed in claim 9, wherein said establishing an one-time communication key further includes:
    said access control server transmitting a token pair to said home gateway through said token;
    said home gateway generating a session key through a non-invertible function;
    said user also generating said session key through said ticket and a selected random number; and
    commands transmitted by said user to said home gateway being encrypted with said session key and answers transmitted by said home gateway to said user being also encrypted by said session key.

* * * * *